United States Patent Office 3,284,432
Patented Nov. 8, 1966

3,284,432
POLYMERIZATION OF ETHYLENE IN THE PRESENCE OF A FREE RADICAL INITIATOR AND AMMONIA
George A. Mortimer, La Marque, Tex., assignor to Monsanto Company, St. Louis, Mo., a corporation of Delaware
No Drawing. Filed Dec. 29, 1961, Ser. No. 163,021
9 Claims. (Cl. 260—94.9)

This invention relates to the polymerization of ethylene at high pressures. More particularly, it is concerned with inhibiting the catalytic polymerization of ethylene at elevated temperatures and pressures with trace amounts of ammonia.

Various proposals have been made for polymerizing ethylene, the prime objective of which has been the production of high molecular weight polymers. It is known that solid polymers of ethylene can be produced by employing elevated pressures such as from 1,000 to 2,000 atmospheres and elevated temperatures such as from 100 to 400° C. Various catalysts can be used to initiate the polymerization reaction depending on the product properties desired. Oxygen, numerous peroxides, and azo compounds are commonly used as initiators. To produce a polymer of certain specific properties of density, molecular weight, melt viscosity, tensile strength, stiffness and appearance, minor amounts of compounds known as modifiers are added to the feed. Some modifiers which are well known for their various effects on the product are propane, xylene, cyclohexane, acetone, propylene, carbon tetrachloride, chloroform and ethane.

All of the above catalysts, however, are used to increase the conversion of ethylene to polyethylene or are used because of the unique properties which they impart to the polymer. Likewise, all of the known modifiers are used to obtain some characteristic or property in the polymer which otherwise could not be obtained. None of these catalysts, or modifiers, are capable of controlling the reaction so that carbonization does not occur, or, even more importantly, of preventing explosions in the process. Those skilled in the art have always desired and sought a compound which could be added with the catalyst, or modifier, or separately which would control or inhibit the polymerization rate depending on the amount added.

If it were desired to handle ethylene at high pressures and temperatures without polymerization occurring, or if it were desired to carry out ionic reactions with ethylene under these conditions while suppressing free-radical polymerization, it would be necessary to have an inhibitor present. This is true because even the purest ethylene contains some oxygen, and ionic reactants might contain oxygen, peroxides, azo compounds, etc., which are known to induce free-radical polymerization. Ethylene, being a gas under normal conditions, would preferably be inhibited with a gaseous inhibitor.

It has now been discovered that the polymerization of ethylene to polyethylene at elevated temperatures and pressures can be controlled and inhibited by the addition of small amounts of ammonia. The addition of ammonia to the reactor is believed to act on the free radicals which initiate the polymerization reaction and thus allows the reaction to die out. The addition of more catalyst which generates the free radicals necessary for polymerization will have no effect on the reaction as long as the ammonia present is sufficient to act on the free radicals.

It is, therefore, the object of this invention to provide a high pressure ethylene polymerization inhibitor which will control or entirely inhibit the polymerization at high pressures and temperatures. This and other objects of the invention will become apparent from the following description.

According to the present invention, the polymerization of ethylene at high pressures and temperatures in the presence of a free radical type initiator is controlled and inhibited by adding trace amounts of ammonia with one of the reactants, or separately.

The following examples are given to illustrate the invention, but they are not introduced with the intention of unduly limiting the generally broad scope of the invention. All measurements are on a mole basis.

*Example I*

A steel pressure bomb, after careful purging of the bomb itself and all lines connected thereto to eliminate traces of air, was filled with ethylene and 6 cc. of acetone as a chemical modifier. Hot ethylene was pumped into the bomb until the pressure reached 1,300 p.s.i. and 130° C. The mechanical agitator inside the bomb was started and 11.8 parts per million of di-tertiary-butyl peroxide was added as the initiator. The bomb was then pressured by means of an ethylene pump to the final conditions of 20,000 p.s.i. and 130° C. The acetone was calculated as 1.93 mole percent of the total contents of the bomb. The rate of polymerization at the final conditions was determined to be 8.5 weight percent of polyethylene per hour based on a 45 minute run.

*Example II*

Ethylene was polymerized in the steel bomb under the identical conditions as in Example I except that propane was fed with the ethylene to the bomb as a modifier in an amount to equal approximately 14.5 mole percent of the total contents of the bomb. In a 43 minute run the rate of polymerization at the final conditions was determined to be 8.4 weight percent per hour.

*Example III*

Ethylene was polymerized in the steel bomb under the identical conditions as in Example I except that 10.0 cc. of acetone was added to the bomb as a chemical modifier and 99 parts per million of ammonia was fed with the ethylene. The acetone amounted to 3.5 mole percent of the total contents of the bomb at final conditions. The rate of polymerization at final conditions after a 40 minute run was determined to be 5.2 weight percent per hour.

*Example IV*

Ethylene was polymerized in the steel bomb under the identical conditions as in Example I except that approximately 14.5 mole percent propane was fed with the ethylene as a modifier and 980 parts per million of ammonia was fed with the ethylene as an initiator. After a 47 minute run, the rate of polymerization at the final condition was zero.

*Example V*

Ethylene was polymerized in the steel bomb under the identical conditions as in Example IV except the ammonia that was fed with the ethylene and propane was 29,600 parts per million. After a 60 minute run, there was again no detectable rate of polymerization at the final conditions of pressure and temperature.

*Example VI*

Ethylene was polymerized in the steel bomb of Example I at 7,500 p.s.i. and 70° C. in the presence of 250 parts per million of di-methyl azobis-isobutyrate as an initiator, and 6,300 parts per million of ammonia. There was no modifier added with the feed materials. After a period of 92.5 minutes, there was no detectable rate of polymerization at the final conditions of pressure and temperature.

It is apparent from the examples above that the addition of ammonia to the ethylene to be polymerized completely inhibits the rate of polymerization when added in more than approximately 500 parts per million of the feed materials. Even such a small amount of ammonia as 90 parts per million was found to inhibit or control the rate of polymerization. To anyone skilled in the art, it is obvious that the use of ammonia can be very advantageously employed when the rate of polymerization of ethylene at high pressures and temperature is sought to be controlled or inhibited at some point in the reaction.

The quantity of ammonia which may be used to control the polymerization reaction in this invention is in the range from about 5 parts to about 1,000 parts per million parts of ethylene or higher if necessary to inhibit a run-away reaction. In practice, the preferred quantity of ammonia is that quantity needed to control the reaction at the proper rate and would likely vary from approximately 10 parts per million to about 100 parts per million of the ethylene present based on a weight ratio.

Ammonia may be used to control or inhibit the polymerization of ethylene in the presence of any type of high pressure ethylene initiator. It is effective in the presence of peroxides, azo compounds, or oxygen. Likewise, the ammonia of this invention is effective to inhibit or control the polymerization of ethylene in the presence of any chemical modifier which may be used in the ordinary ethylene polymerization reaction. These include chemical modifiers from the groups of aliphatic hydrocarbons having at least 3 carbon atoms, alkyl aromatic hydrocarbons having alpha hydrogen atoms, cyclic hydrocarbons, halogen substituted hydrocarbons, alcohols, ketones, ethers and esters. Particularly good modifiers are propane, heptane, octadecene, butene-1, acetone, xylene, cumene, toluene, cyclohexane, cyclopentane, methylene chloride, chloroform, carbon tetrachloride, methanol, ethanol, isopropanol, methyl ethyl ketone, cyclohexanone, tetrahydrofuran, dioxane, dibutyl ether, ethyl acetate, hydrogen and carbon dioxide.

This polymerization process exemplified herein may be carried out in either a batch or continuous type operation. The batch operation is conducted in the same manner as is described in Example I herein. The preferred method of polymerizing ethylene, however, is of the continuous type wherein the ethylene, chemical modifier, and catalyst are charged to a reactor maintained under suitable conditions of temperature and pressure. The polymer in this operation is separated from the reactor effluent continuously and the unreacted ethylene, and chemical modifier, are recycled to the reaction zone.

The polymerization reaction pressure at which the process of this invention can be successfully conducted is in the range from about 5,000 p.s.i. to about 50,000 p.s.i. although the preferred range is from about 15,000 p.s.i. to about 40,000 p.s.i. The temperature required in the practice of this invention may likewise be varied over a wide range from about 50° C. to about 400° C. with the range from about 150° C. to about 300° C. being preferred.

What is claimed is:

1. In a process for the polymerization of ethylene at elevated temperatures and pressures in the presence of a free-radical initiator chosen from the group consisting of peroxides, azo compounds and oxygen, the improvement which comprises controlling the polymerization reaction by the addition of trace amounts of ammonia.

2. In a process for the polymerization of ethylene at a temperature in the range of from about 50° C. to about 400° C. at a pressure in the range from about 5,000 p.s.i. to about 50,000 p.s.i. in the presence of a free-radical initiator chosen from the group consisting of peroxides, azo compounds and oxygen, the improvement which comprises controlling the polymerization reaction by adding trace amounts of ammonia.

3. The process as described in claim 2 wherein a chemical modifier chosen from the group consisting of aliphatic hydrocarbons having at least 3 carbon atoms, alkylaromatic hydrocarbons having alpha hydrogen atoms, cyclic hydrocarbons, halogen substituted hydrocarbons, alcohols, ketones, ethers and esters is present during the polymerization reaction.

4. The process as described in claim 2 wherein the ammonia is present in an amount from about 5 parts to about 1,000 parts per million parts of ethylene by mole.

5. The process as described in claim 3 wherein the ammonia is present in an amounts from about 5 parts per million to about 1,000 parts per mililon.

6. The process of claim 2 wherein the free radical initiator is a peroxide.

7. The process of claim 2 wherein the free radical initiator is an azo compound.

8. The process of claim 2 wherein the free radical initiator is free oxygen.

9. In a process for the polymerization of ethylene at elevated temperatures and pressures in the presence of an oxygen catalyst the improvement which comprises adding ammonia wherein the ammonia is present in an amount from about 5 parts to about 1,000 parts per million parts of ethylene.

No references cited.

JOSEPH L. SCHOFER, *Primary Examiner.*

WILLIAM H. SHORT, *Examiner.*

D. E. OLSON, E. M. OLSTEIN, *Assistant Examiners.*